(12) United States Patent
Zitting et al.

(10) Patent No.: US 7,667,344 B2
(45) Date of Patent: Feb. 23, 2010

(54) COUPLING COMMUNICATIONS SIGNALS TO UNDERGROUND POWER LINES

(75) Inventors: Brent R. Zitting, Huntsville, AL (US); Thomas R. Parker, III, Birmingham, AL (US); William D. Hudson, Glencoe, AL (US)

(73) Assignee: International Broadband Electric Communications, Inc., Huntsville, AL (US)

( * ) Notice: Subject to any disclaimer, the term of this patent is extended or adjusted under 35 U.S.C. 154(b) by 79 days.

(21) Appl. No.: 11/426,116

(22) Filed: Jun. 23, 2006

(65) Prior Publication Data
US 2007/0013491 A1    Jan. 18, 2007

Related U.S. Application Data

(60) Provisional application No. 60/700,040, filed on Jul. 15, 2005.

(51) Int. Cl.
*H02J 3/00* (2006.01)
*H04B 3/54* (2006.01)
*G08B 1/08* (2006.01)

(52) U.S. Cl. .................. 307/1; 307/2; 307/3; 307/4; 340/310.17; 340/310.18; 340/538.16; 340/538.17

(58) Field of Classification Search ............ 307/1, 307/2, 3, 4; 340/310.17, 310.18, 538.16, 340/538.17
See application file for complete search history.

(56) References Cited

U.S. PATENT DOCUMENTS

| | | |
|---|---|---|
| 1,730,412 A | 10/1929 | Duncan, Jr. |
| 4,142,178 A | 2/1979 | Whyte et al. ............ 340/310 R |
| 4,438,519 A | 3/1984 | Bose ............................. 375/1 |
| 4,471,399 A | 9/1984 | Udren ........................ 361/64 |

(Continued)

FOREIGN PATENT DOCUMENTS

WO    WO 01/82497 A1    11/2001

(Continued)

OTHER PUBLICATIONS

PCT, Notification of Transmittal of the International Search Report and the Written Opinion of the International Searching Authority, or the Declaration, PCT/US06/25642,10 pages, Date Mailed Dec. 18, 2006.

(Continued)

*Primary Examiner*—Albert W Paladini
*Assistant Examiner*—Hal I Kaplan
(74) *Attorney, Agent, or Firm*—Baker Botts L.L.P.

(57) ABSTRACT

In one embodiment, a system for coupling communications signals to an underground medium-voltage power line includes a medium-voltage power line, a ground conductor, one or more ferrites, and a low-voltage communications line. The medium-voltage power line includes a center phase conductor and a concentric neutral conductor. The ground conductor couples the concentric neutral conductor to a ground connection. The one or more ferrites substantially surround at least a portion of the ground conductor. The low-voltage communications line includes a first conductor and a second conductor. The first conductor is coupled to the ground conductor between the one or more ferrites and the concentric neutral conductor. And the second conductor is coupled to the ground conductor between the one or more ferrites and the ground connection.

20 Claims, 6 Drawing Sheets

U.S. PATENT DOCUMENTS

| | | | | |
|---|---|---|---|---|
| 4,845,466 | A | 7/1989 | Hariton et al. | 340/310 R |
| 5,351,272 | A | 9/1994 | Abraham | 375/38 |
| 5,684,826 | A | 11/1997 | Ratner | 375/222 |
| 5,777,769 | A | 7/1998 | Coutinho | 359/173 |
| 5,856,776 | A | 1/1999 | Armstrong et al. | 340/310.01 |
| 5,864,284 | A | 1/1999 | Sanderson | 340/310.01 |
| 5,892,430 | A | 4/1999 | Wiesman et al. | 340/310.01 |
| 5,892,431 | A | 4/1999 | Osterman | 340/310.01 |
| 5,929,750 | A | 7/1999 | Brown | 340/310.02 |
| 5,933,071 | A | 8/1999 | Brown | 340/310.01 |
| 5,937,342 | A | 8/1999 | Kline | 455/402 |
| 5,949,327 | A | 9/1999 | Brown | 340/310.01 |
| 6,037,678 | A | 3/2000 | Rickard | 307/89 |
| 6,040,759 | A | 3/2000 | Sanderson | 340/310.01 |
| 6,144,292 | A | 11/2000 | Brown | 340/310.02 |
| 6,218,624 | B1 * | 4/2001 | Hanssen et al. | 174/126.4 |
| 6,243,571 | B1 | 6/2001 | Bullock et al. | 455/402 |
| 6,278,357 | B1 | 8/2001 | Croushore et al. | 340/310.01 |
| 6,282,405 | B1 | 8/2001 | Brown | 455/6.1 |
| 6,396,392 | B1 | 5/2002 | Abraham | 340/310.01 |
| 6,396,393 | B2 | 5/2002 | Yuasa | 340/310.01 |
| 6,452,482 | B1 | 9/2002 | Cern | 340/310.01 |
| 6,492,897 | B1 | 12/2002 | Mowery, Jr. | 340/310.01 |
| 6,493,201 | B1 | 12/2002 | Kulkarni et al. | 361/119 |
| 6,496,104 | B2 | 12/2002 | Kline | 340/310.01 |
| 6,646,447 | B2 | 11/2003 | Cern et al. | 324/539 |
| 6,683,531 | B2 | 1/2004 | Diamanti et al. | 340/310.03 |
| 6,785,532 | B1 | 8/2004 | Rickard | 455/402 |
| 6,809,633 | B2 | 10/2004 | Cern | 340/310.07 |
| 6,844,810 | B2 | 1/2005 | Cern | 340/310.07 |
| 6,854,059 | B2 | 2/2005 | Gardner | 713/171 |
| 6,876,289 | B2 | 4/2005 | Lenk et al. | 337/30 |
| 6,885,674 | B2 | 4/2005 | Hunt et al. | 370/420 |
| 6,897,764 | B2 | 5/2005 | Cern | 340/310.01 |
| 6,965,302 | B2 | 11/2005 | Mollenkopf et al. | 340/310.01 |
| 6,980,089 | B1 | 12/2005 | Kline | 340/310.01 |
| 2001/0038329 | A1 | 11/2001 | Diamanti et al. | 340/310.01 |
| 2001/0045888 | A1 | 11/2001 | Kline | 340/310.01 |
| 2002/0002040 | A1 | 1/2002 | Kline et al. | 455/402 |
| 2002/0097953 | A1 | 7/2002 | Kline | 385/24 |
| 2002/0105413 | A1 | 8/2002 | Cern et al. | 340/310.01 |
| 2002/0109585 | A1 | 8/2002 | Sanderson | 340/310.01 |
| 2002/0171535 | A1 | 11/2002 | Cern | 340/310.07 |
| 2003/0039257 | A1 | 2/2003 | Manis et al. | 370/400 |
| 2003/0054793 | A1 | 3/2003 | Manis et al. | 455/402 |
| 2003/0160684 | A1 | 8/2003 | Cern | 340/310.01 |
| 2003/0190110 | A1 | 10/2003 | Kline | 385/15 |
| 2003/0210135 | A1 | 11/2003 | Cern | 340/310.07 |
| 2003/0224784 | A1 | 12/2003 | Hunt et al. | 455/426.2 |
| 2003/0228005 | A1 | 12/2003 | Melick et al. | 379/93.01 |
| 2003/0234713 | A1 | 12/2003 | Pridmore, Jr. et al. | 336/82 |
| 2004/0003934 | A1 | 1/2004 | Cope | 174/36 |
| 2004/0056734 | A1 | 3/2004 | Davidow | 333/100 |
| 2004/0135676 | A1 | 7/2004 | Berkman et al. | 340/310.01 |
| 2004/0142599 | A1 | 7/2004 | Cope et al. | 439/620 |
| 2004/0223617 | A1 | 11/2004 | Corcoran et al. | 380/266 |
| 2004/0227621 | A1 | 11/2004 | Cope et al. | 340/310.01 |
| 2004/0227622 | A1 | 11/2004 | Giannini et al. | 340/310.01 |
| 2004/0246107 | A1 | 12/2004 | Kline | 340/310.01 |
| 2005/0001693 | A1 | 1/2005 | Berkman | 33/24 R |
| 2005/0007241 | A1 | 1/2005 | Kline et al. | 340/310.01 |
| 2005/0017825 | A1 | 1/2005 | Hansen | 333/242 |
| 2005/0030118 | A1 | 2/2005 | Wang | 333/24 R |
| 2005/0076149 | A1 | 4/2005 | McKown et al. | 709/249 |
| 2005/0111533 | A1 | 5/2005 | Berkman et al. | 375/220 |
| 2005/0111553 | A1 | 5/2005 | Seok et al. | 375/240.17 |

FOREIGN PATENT DOCUMENTS

| | | |
|---|---|---|
| WO | 2004/068638 A2 | 8/2004 |

OTHER PUBLICATIONS

PCT, Notification of Transmittal of the International Search Report and the Written Opinion of the International Searching Authority, or the Declaration, PCT/US06/26433, 10 Pages, Date Mailed Feb. 12, 2007.

PCT, PCT/US06/21983, "Notification of Transmittal of the International Search Report and the Written Opinion of the International Searching Authority, or the Declaration," 10 pages, Mailed Apr. 26, 2007.

*Notification of Transmittal of the International Search Report and the Written Opinion of the International Searching Authority* for International Application No. PCT/US06/25176; 8 pages, Oct. 22, 2007.

Mara, "Compatibility of Broadband Over Power Line Systems with Existing Electrical Distribution Infrastructure," HiLine Engineering LLC., white paper, 20 pages, Feb. 3, 2004.

Mitsubishi Electric, "Mitsubishi PLC/BPL System Overview," Mitsubishi Electric Corporation, slide handout sheets, 8 pages, Mar. 15, 2004.

Sumitomo Electric, "Development of PLC in Sumitomo Electric," Sumitomo Electric Industries, Ltd., slide handout sheets, 10 pages, Mar. 2004.

Arteche, "UNIC Interface Between PLC and Medium Voltage Power Lines," brochure, Arteche Group, ISO 9001:2000-ISO 14001, 2 pages, Undated.

Arteche, "Soluciones de Acoplamientos PLC Coupling Solutions," brochure, Arteche Group, ISO 9001:2000-ISO 14001, 5 pages, Undated.

Ilevo◇, "TPE LR 1000," brochure, Ilevo AB, 2 pages, Q1 -03.

Ilevo◇, "Trial Kit," brochure, Ilevo AB, SP1001-MD-002, 2 pages, Undated.

Ilevo◇, "CPE LR 100," brochure, Ilevo AB, PP1038-MD002, 2 pages, Q1 -03.

Ilevo◇, "IR LR 1100," brochure, Ilevo AB, PP1009-MD002 LR 1100 IR Rev A, 2 pages, Q1 -03.

Mitsubishi, "Specification" Products for low voltage / middle voltage, brochure, Mitsubishi Electric Corp., 1 page, Prior to Apr. 14, 2004.

Ohio/Brass, "Quality Products for over 100 years," Supplemental Catalog Bulletin 31-16, Hubbell Power Systems, Inc., The Ohio/Brass Company, 3 pages, Oct. 1996.

Ohio/Brass, DynaVar® Distribution Class (PDV) and Riser Pole (PVR) Surge Arresters, brochure, Hubbell Power Systems, Inc., Ohio/Brass Company, ANSI/IEEE C62.11 Tested, IEC 99-4 Tested, Section 31, ISO 9001-94, Cert No. 002196, 15 pages, Oct. 1996.

Cooper, "Surge Arresters, UltraSIL™ Housed VariSTAR® Surge Arresters: Normal Duty (5 kA), Heavy Duty (10 kA), and Heavy Duty Riser Pole (10 kA)," Electrical Apparatus 235-35, Cooper Power Systems, 12 Pages, Jan. 2000 Supercedes Nov. 1996.

Hubbell, "PDE™ Distribution Class Elbow Arresters," brochure, Hubbell Power Systems, Inc., Ohio Brass Co., Section 69, ISO 9001-94, Cert. No. 002196, ANSI/IEEE C62.11 Tested, 8 pages, Nov. 2002.

Zitting, et al., "A Device and Method for Enabling Communications Signals Using a Medium Voltage Power Line," U.S. Appl. No. 11/170,413, pending, 30 pages, Filed Jun. 28, 2005.

Zitting, "Improved Coupling of Communications Signals to a Power Line," U.S. Appl. No. 11/425,271, pending, 33 pages, Filed Jun. 20, 2006.

Zitting, et al., "Improved Coupling of Communications Signals to a Power Line," U.S. Appl. No. 11/425,288, pending, 30 pages, Filed Jun. 20, 2006.

* cited by examiner

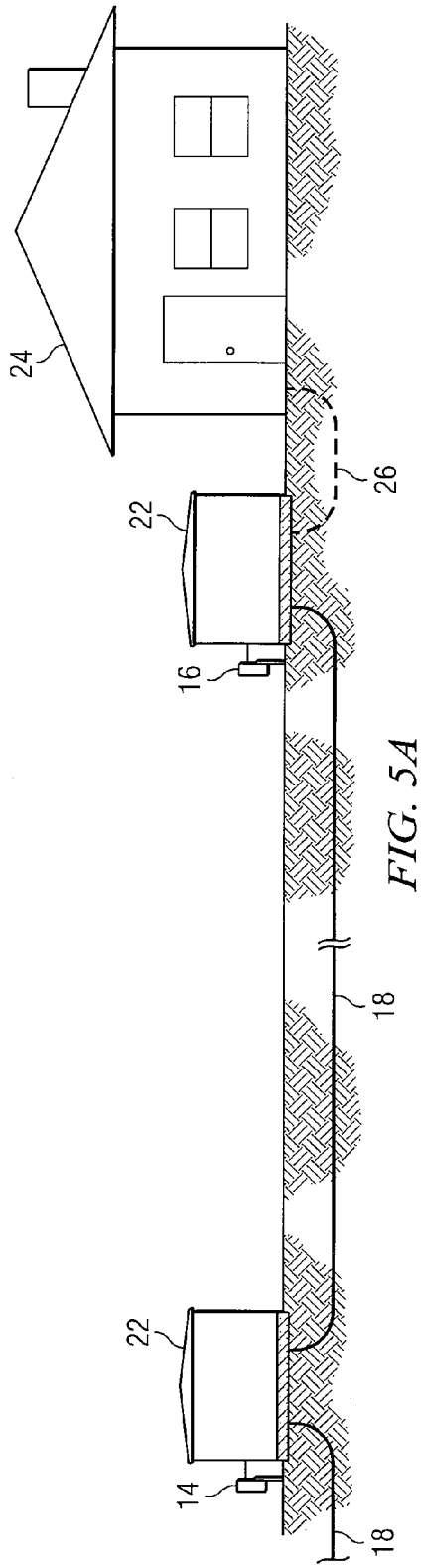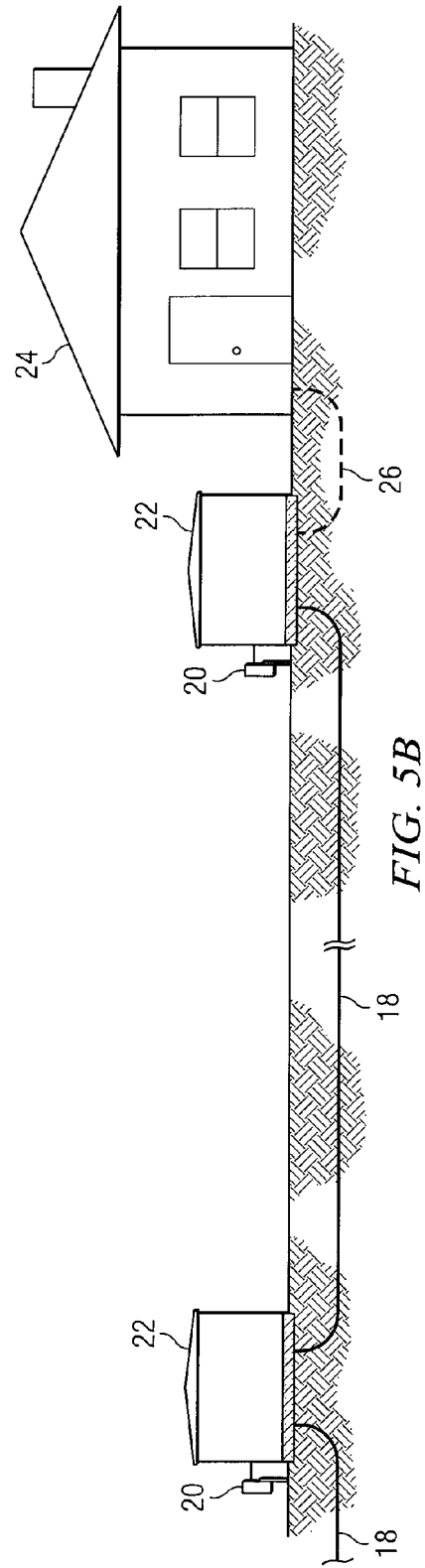

COUPLING COMMUNICATIONS SIGNALS TO UNDERGROUND POWER LINES

RELATED APPLICATIONS

This application claims the benefit under 35 U.S.C. §119 (e) of U.S. Provisional Application Ser. No. 60/700,040 filed Jul. 15, 2005.

TECHNICAL FIELD

This invention relates generally to communications networks and in particular to a system and method for coupling communications signals to underground power lines.

BACKGROUND

Power systems utilize a variety of electrical devices and connectors to deliver electricity from a power station or generator to customers. Some power systems utilize a three-tiered approach that utilizes high-voltage power lines with voltages in the range from approximately 60kV to 100kV, medium-voltage power lines with voltages in the range from approximately 4kV to 60kV, and low-voltage power lines with voltages in the range from approximately 90V to 600V. Medium-voltage and low-voltage power lines power lines can be positioned above the ground or under the ground in different configurations.

In these three-tiered power systems, high-voltage power lines typically connect a power station or generator to a substation. The substation serves a particular area such as a neighborhood or community and includes a transformer to step-down the voltage from high voltage to medium voltage. Typically, multiple sets of medium-voltage power lines connect the substation to local distribution transformers. The distribution transformers typically serve the customers in close proximity to the distribution transformer and step-down the voltage from medium voltage to low voltage for use by the customers. The distribution transformers are typically mounted either on a pole or on the ground.

The power lines used to deliver electricity to customers have also been used to transmit and receive communications signals. For example, power lines have been used by utility companies to transmit and receive low bandwidth communications signals to monitor equipment and to read meters. Power lines have also been used to provide broadband communications for customers. Various techniques have been developed to couple broadband communications signals to medium-voltage power lines. These broadband communications signals typically occupy frequencies in the 2-50 MHz region. One approach to coupling communications signals to these medium-voltage power lines is to use the intrinsic capacitance of metal oxide varistor (MOV) lightning arresters to couple a portion of the communications radio frequency signals onto medium-voltage power lines.

SUMMARY OF THE INVENTION

In one embodiment, a system for coupling communications signals to an underground medium-voltage power line includes a medium-voltage power line, a ground conductor, one or more ferrites, and a low-voltage communications line. The medium-voltage power line includes a center phase conductor and a concentric neutral conductor. The ground conductor couples the concentric neutral conductor to a ground connection. The one or more ferrites substantially surround at least a portion of the ground conductor. The low-voltage communications line includes a first conductor and a second conductor. The first conductor is coupled to the ground conductor between the one or more ferrites and the concentric neutral conductor. And the second conductor is coupled to the ground conductor between the one or more ferrites and the ground connection.

Particular embodiments of the present invention may provide one or more technical advantages. For example, certain embodiments of the present invention may provide a low-cost solution for coupling communications signals to medium-voltage power lines using the intrinsic properties of underground medium-voltage power lines. As another example, certain embodiments may provide for quick and simple installation with few changes to existing equipment. In these embodiments, the quick and simple installation may allow for rapid deployment of communications coverage and/or rapid repair in the event of damage. As yet another example, certain embodiments of the present invention allow for improved safety by providing installation techniques that do not require existing medium-voltage power line connections to be disconnected or disturbed. In addition, certain embodiments may provide one or more other technical advantages, some, none, or all of which may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 5A and 5B illustrate example power-line communications systems, including underground power lines, according to particular embodiments;

DESCRIPTION OF EXAMPLE EMBODIMENTS

It should be understood at the outset that although example embodiments of the invention are illustrated below, the present invention may be implemented using any number of techniques, whether currently known or not. The present invention should in no way be limited to the illustrated embodiments, drawings, and techniques. Additionally, the drawings are not necessarily drawn to scale.

Figure 1A:
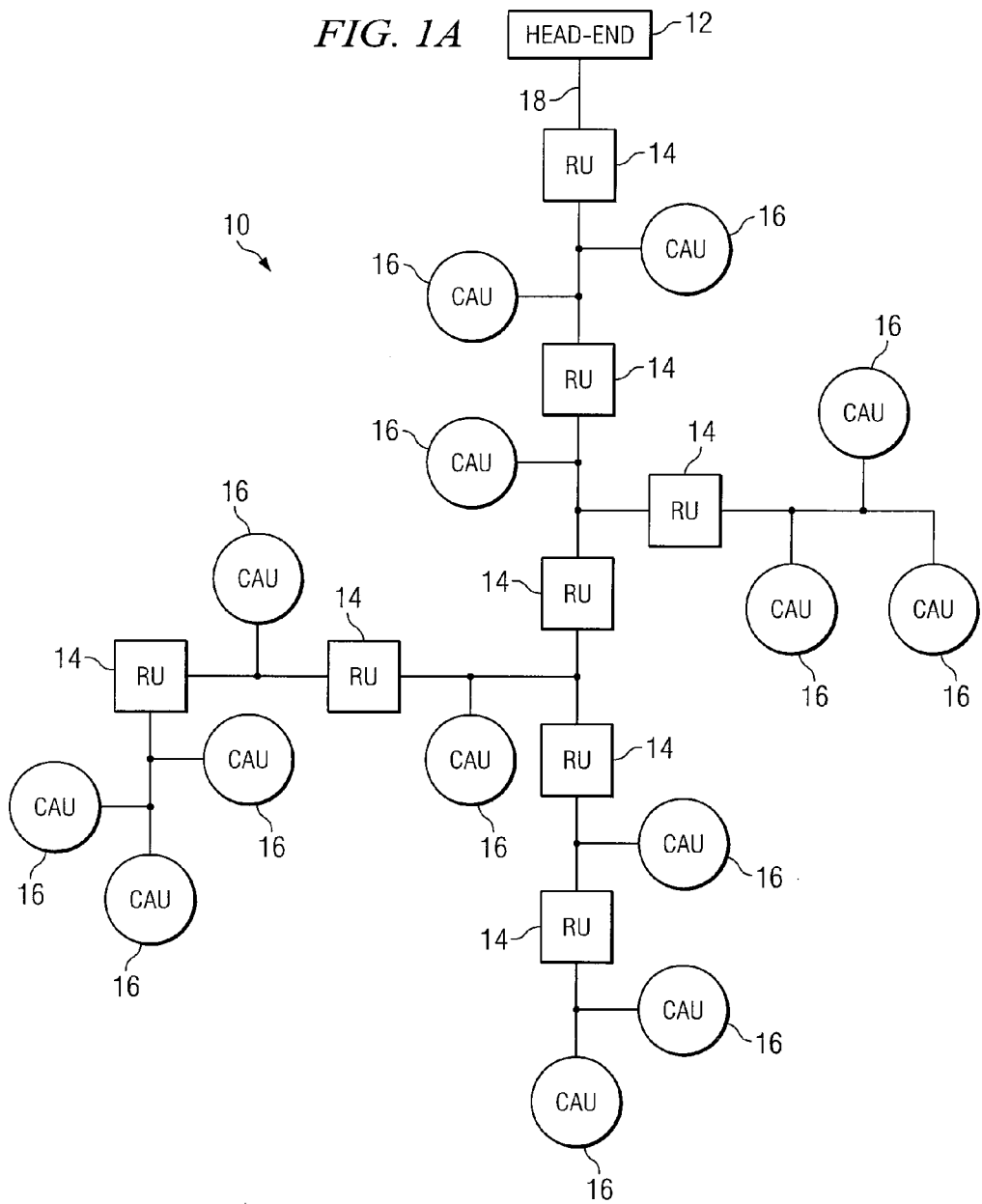
FIGS. 1A and 1B illustrate example power-line communications systems, according to particular embodiments.
Figure 1B:
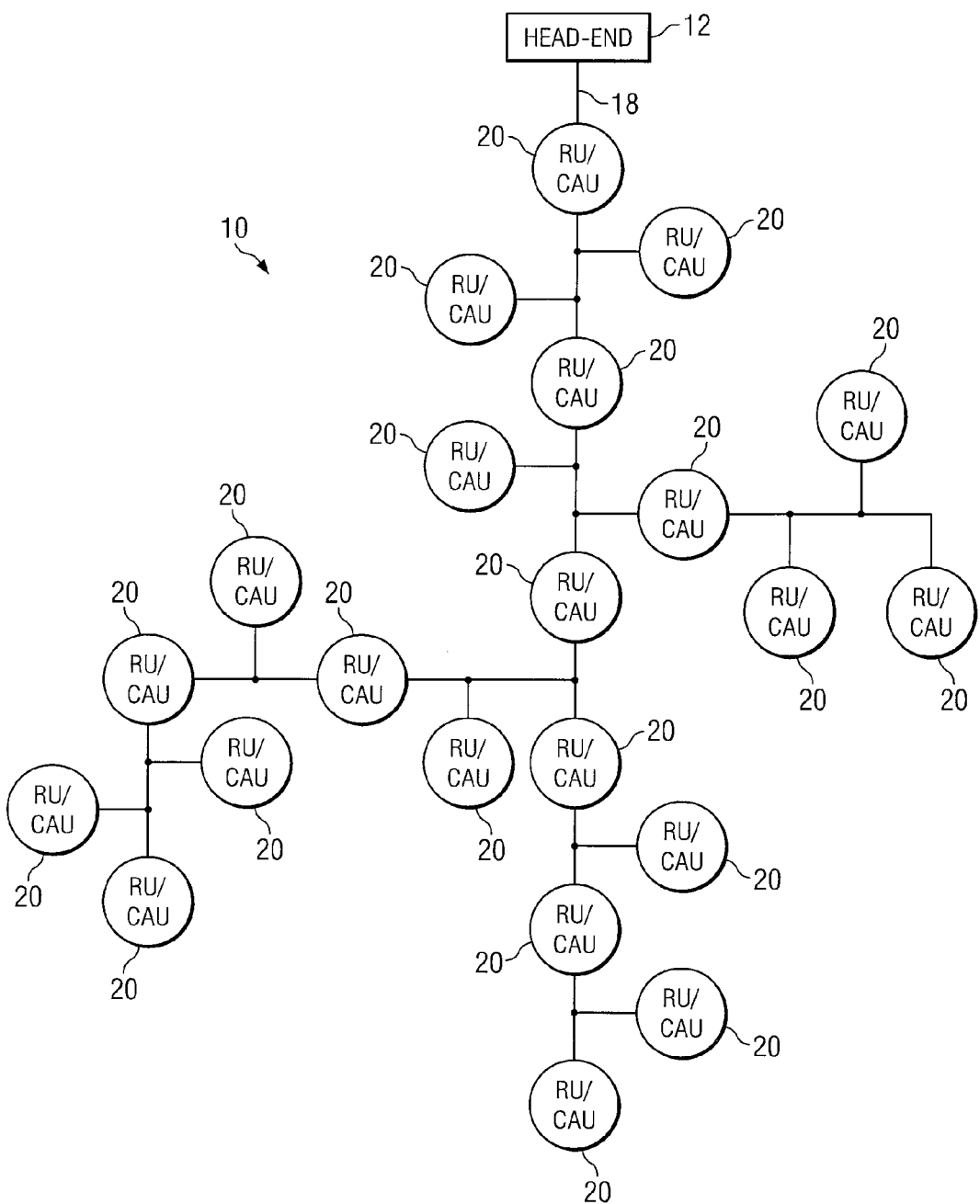

FIGS. 1A and 1B illustrate example power-line communications systems, indicated generally at 10, according to particular embodiments. In certain embodiments, power-line communications system 10 may function to provide one or more customers with access to a wide area network (WAN) of communication signals. For example, power-line communications system 10 may function to provide one or more customers with access to data services, video services, voice-over-Internet-Protocol (VoIP), or plain-old-telephone service (POTS). As another example, the communications signals may represent broadband communication signals with upstream and/or downstream traffic at transmission rates of at least 200 kbps. In a particular example, power-line communications system 10 may function to provide one or more customers with access to the Internet.

As shown in FIG. 1A, in certain embodiments, power-line communications system 10 may include a head-end unit 12, regenerator units 14, customer-access units 16, and medium-voltage power lines 18.

Head-end unit 12 couples power-line communication system 10 to one or more external networks or content sources. In certain embodiments, head-end unit 12 includes hardware for coupling to one or more external networks and hardware for coupling to a medium-voltage power line 18. In a particular embodiment, head-end unit 12 includes hardware for transmitting and/or receiving communications signals, including a radio frequency (RF) carrier signal with digital information, on a medium-voltage power line 18. Medium-voltage power lines 18 represent transmission power lines operable to connect a substation to one or more distribution transformers. In certain embodiments, medium-voltage power lines 18 may be underground power transmission lines. In particular embodiments, medium-voltage power lines 18 may deliver an alternating current (AC) of electricity between approximately 4 and 60 kilovolts. In certain embodiments, head-end unit 12 also includes hardware and/or software for transmitting and/or receiving communications signals to and from one or more external networks and communications system 10. For example, head-end unit 12 may couple communications system 10 to an Internet backbone through the use of a wireless and/or wireline connection, such as a fiber-optic connection. As another example, head-end unit 12 may couple power-line communications system 10 to a cable distribution network, to a voice-communications network, or to a wireless metropolitan area network (MAN). In certain embodiments, head-end unit 12 may include a modem to interface with a medium-voltage power line 18 and an optical transceiver to interface with a fiber-optic communication medium. Thus, head-end unit 12 represents any appropriate hardware and/or controlling logic for coupling communications system 10 to one or more external networks or content sources.

Regenerator units 14 may receive communications signals from medium-voltage power line 18, regenerate at least a portion of the communications signals, and then transmit at least a portion of the regenerated communications signals back to medium-voltage power line 18. Thus, regenerator unit 14 represents any appropriate hardware and/or controlling logic for regenerating communications signals on medium-voltage power line 18. An example embodiment of regenerator units 14 is discussed below in relation to FIG. 2.

Customer-access units 16 operate to receive communications signals from medium-voltage power line 18 and transmit at least a portion of the communications signals on a low-voltage power line. Thus, customer-access unit 16 represents any appropriate hardware and/or controlling logic for receiving communications signals from medium-voltage power line 18 and transmitting communications signals to a low-voltage power line. An example embodiment of customer-access unit 16 is discussed below in relation to FIG. 3.

In operation, communications signals are coupled to power-line communications network 10 through head-end unit 12. These communications signals are carried along medium-voltage power lines 18 to one or more customer-access units 16. As the communications signals travel along medium-voltage power lines 18, the communications signals become attenuated. To minimize the effects of these attenuations, one or more regenerator units 14 may be utilized to regenerate the communications signals and, in certain embodiments, bypass any transformers that would degrade or destroy the communications signals. For example, in a particular embodiment, regenerator units 14 may be located approximately every half-mile along medium-voltage power line 18 to regenerate the communications signals. Once the communications signals reach customer-access units 16, they are transmitted to low-voltage distribution power lines for delivery to one or more customers (as well as being communicated past customer-access units 16, as appropriate). In certain embodiments, communications signals transmitted over medium-voltage power lines 18 may be bi-directional. For example, communications signals transmitted over medium-voltage power lines 18 may generally travel from head-end unit 12 toward customer-access units 16 and also from customer-access units 16 toward head-end unit 12. In certain embodiments, the bi-directional functionality may be achieved through frequency domain multiplexing, through a half-duplex transmission protocol, or through other appropriate techniques. In certain embodiments, communications network 10 may operate to enable multiple end-users to transmit and/or receive broadband communications signals. For example, the broadband communications signals may represent upstream and/or downstream traffic at transmission rates of at least 200 Kbps.

As shown in FIG. 1B, in certain embodiments, power-line communications system 10 may include combination regenerator/customer-access units 20 in place of regenerator units 14 and/or customer-access units 16. Regenerator/customer-access units 20 represent one or more devices adapted to provide the functions of both regenerator units 14 and customer-access units 16. Thus, regenerator/customer-access unit 20 represents any appropriate hardware and/or controlling logic for receiving communications signals from medium-voltage power line 18, for regenerating at least a portion of those received communications signals on medium-voltage power line 18, and for transmitting at least a portion of those received communications signals to a low-voltage power line. An example embodiment of regenerator/customer-access unit 20 is discussed below in relation to FIG. 4. Although not shown, in certain embodiments power-line communications system 10 may include any combination of appropriate communication devices, including regenerator units 14, customer-access units 16, regenerator/customer-access units 20, and/or any other devices adapted to provide the functions of these components.

Although, certain aspects and functions of the present invention are described in terms of receiving and/or transmitting communications signals, in certain embodiments, these functions may be reversed, as may be appropriate, without departing from the spirit and scope of the present invention.

Figure 2:
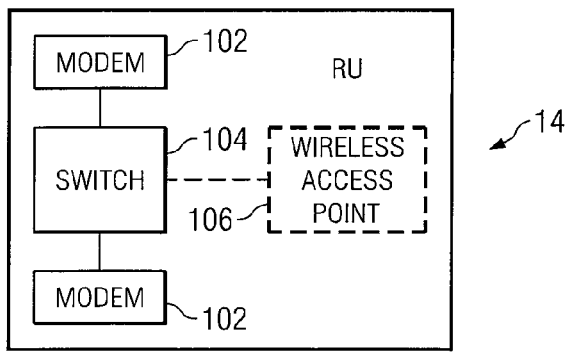
FIG. 2 illustrates an example regenerator unit included in certain embodiments of a power-line communications system.

FIG. 2 illustrates an example regenerator unit 14 included in certain embodiments of power-line communications system 10. In the example shown, regenerator unit 14 includes two modems 102, switch 104, and wireless access point 106. In certain embodiments, regenerator unit 14 may be electrically coupled to medium-voltage power line 18 and may be electrically coupled to an electrical power source to provide power for the elements of regenerator unit 14. In certain embodiments, the power source may be a low-voltage power source.

Modems 102 are electrically coupled to medium-voltage power line 18. In operation, modems 102 demodulate communications signals received from medium-voltage power line 18 and/or modulate communications signals for transmission on medium-voltage power line 18. Thus modems 102 represent any appropriate hardware and/or controlling logic for modulating and/or demodulating communications signals. In certain embodiments, modems 102 receive and transmit RF signals. For example, modems 102 may represent a HomePlug Powerline Alliance (HPA) compliant modem or a Universal Powerline Association (UPA) compliant modem. In certain embodiments, modems 102 may transmit and receive communications signals through a coaxial connection using an F-connector. In a particular embodiment, modems 102 may represent NetGear modems. Although, in certain embodiments, multiple modems 102 may be the same, this is not necessary.

Switch 104 may couple to modems 102 and wireless access point 106. In operation, switch 104 operates to receive and transmit digital communications signals among the elements of regenerator unit 14. Thus, switch 104 may represent any appropriate hardware and/or controlling logic for directing the flow of digital communications signals among multiple elements of regenerator unit 14. For example, in certain embodiments, switch 104 may be a router, a hub, or an Ethernet switch. In certain embodiments, switch 104 may have an IP address that is unique within power-line communications network 10.

In embodiments of regenerator unit 14 including wireless access point 106, wireless access point 106 operates to transmit and/or receive wireless communications signals. Thus wireless access point 106 represents any appropriate hardware and/or controlling logic for transmitting and/or receiving wireless communications signals. In certain embodiments, wireless access point 106 may transmit and/or receive wireless communications signals using an IEEE 802.11 standard protocol. In a particular embodiment, wireless access point may be a D-Link wireless access point coupled to switch 104 through the use of 10/100 base-T connectors.

In operation, regenerator unit 14 receives communications signals from medium-voltage power line 18, demodulates the received communications signals, re-modulates at least a portion of the received communications signals, and transmits the re-modulated communications signals to medium-voltage power line 18. Thus, in certain embodiments, regenerator unit 14 operates to allow communications signals to travel greater distances along medium-voltage power line 18 without becoming attenuated. Accordingly, regenerator unit 14 may operate to receive communications signals from a medium-voltage power line 18, amplify the communications signals and/or filter out certain types of signal noise, and then re-transmit the communications signals back on the medium-voltage power line 18. In certain embodiments, wireless access point 106 may operate to provide wireless access to one or more wireless devices. For example, wireless access point 106 may operate to create a wireless "hot spot," by providing wireless Internet access to one or more wireless devices. In particular embodiments, wireless access point 106 may operate to allow for monitoring and/or modifying the operation of regenerator unit 14.

Figure 3:
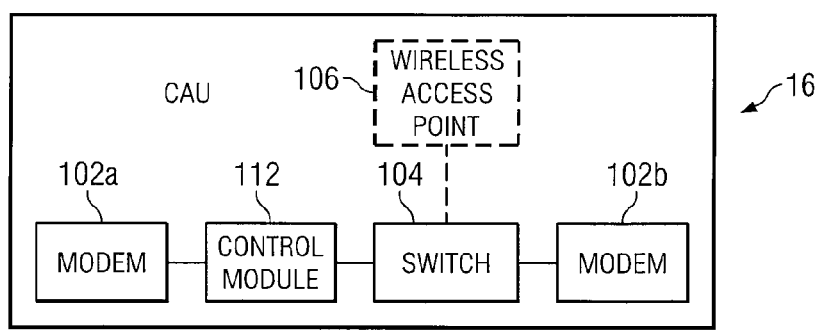
FIG. 3 illustrates an example customer-access unit included in certain embodiments of a power-line communications system.

FIG. 3 illustrates an example customer-access unit 16 included in certain embodiments of power-line communications system 10. In the example shown, customer-access unit 16 includes two modems 102, switch 104, wireless access point 106, and control module 112. Switch 104 and wireless access point 106 included in customer-access unit 16 may be the same or substantially similar to switch 104 and wireless access point 106 described above with regard to regenerator unit 14. For example, switch 104 may represent any appropriate hardware and/or controlling logic for directing the flow of digital communications signals among multiple elements of customer-access unit 16. In certain embodiments, switch 104 may be a router, a hub, or an Ethernet switch.

Modems 102 included in customer-access unit 116 may be the same or substantially similar to modems 102 described above with regard to regenerator unit 14, with the exception that modem 102b may electrically couple to a low-voltage power line. In operation, modem 102a demodulates signals received from medium-voltage power line 18 and/or modulates communications signals for transmission on medium-voltage power line 18; and modem 102b demodulates signals received from a low-voltage power line and/or modulates communications signals for transmission on a low-voltage power line. Thus modems 102 represent any appropriate hardware and/or controlling logic for modulating and/or demodulating communications signals.

Control module 112 operates to control the operation of certain aspects of customer-access unit 16. In certain embodiments, control module 112 may serve as a firewall, a router, and/or an agent. For example, control module 112 may collect and store information related to the quantity and type of communication signals received and transmitted by customer-access unit 16. As another example, control module 112 may prevent particular portions of communications signals received by customer-access unit 16 from being transmitted by customer-access unit 16. In certain embodiments, control module 112 may operate to couple the elements of customer-access unit 16 associated with portions of two logical networks. In certain embodiments, control module 112 may couple elements of customer-access unit 16 associated with a wide area network (WAN) and with a local area network (LAN). For example, control module 112 may couple modem 102a associated with a WAN, such as a WAN formed at least in part by communications network 10, to modem 102b associated with a LAN, such as a LAN associated with a customer. In certain embodiments, control module 112 may serve to control and/or limit the flow of communications signals between the WAN and the LAN. In certain embodiments, control unit 112 may operate to provide remote control and/or remote monitoring of certain aspects of customer-access unit 16. For example, control module 112 may operate to provide remote control and/or remote monitoring through the use of simple network management protocol (SNMP) or through a terminal emulation program such as Telnet. In certain embodiments, control module 112 may operate as an SNMP agent to allow a remote administrator to monitor and/or control one or more parameters related to modems 102 and/or the communications signal traffic within customer-access unit 16. In certain embodiments, control module 112 may include encryption algorithms to restrict access to the control features and or to restrict access from the WAN to the LAN.

In operation, customer-access unit 16 may receive communications signals from a medium-voltage power line 18, demodulate the received communications signals, re-modulate at least a portion of the received communications signals, and transmit the re-modulated communications signal to a low-voltage power line.

Although customer-access unit 16 has been described as receiving communications signals from medium-voltage power line 18 and transmitting communications signals to a low-voltage power line, customer-access unit 16 may also receive communications signals from a low-voltage power line and transmit communications signals to medium-voltage power line 18. In certain embodiments, wireless access point 106 may operate to create a wireless "hot spot," by providing wireless Internet access to one or more wireless devices. In particular embodiments, wireless access point 106 may operate to allow for monitoring and/or modifying the operation of customer-access unit 16.

Figure 4:
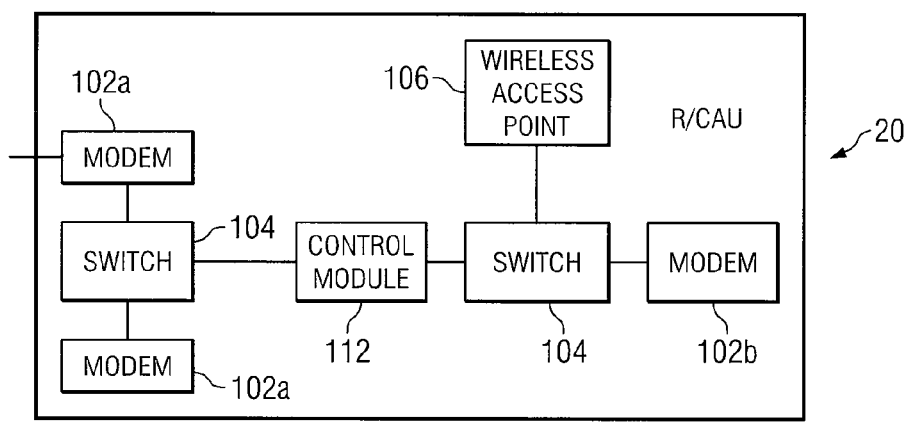
FIG. 4 illustrates an example regenerator/customer-access unit included in certain embodiments of a power-line communications system.

FIG. 4 illustrates an example regenerator/customer-access unit 20 included in certain embodiments of power-line communications system 10. In the example shown, regenerator/customer-access unit 20 includes two modems 102a, one modem 102b, two switches 104, one wireless access point 106, and one control module 112.

Switch 104, wireless access point 106, and control module 112 included in regenerator/customer-access unit 20 may be the same or substantially similar to the same elements described above with regard to regenerator unit 14 and customer-access unit 16. Modem 102a may operate to electrically couple to a medium-voltage power line 18 and modem 102b may operate to electrically couple to a low-voltage power line. In certain embodiments modem 102a may be the same or substantially similar to modem 102 described with respect to regenerator unit 14. Similarly, in certain embodiments, modem 102b may be the same or substantially similar to modem 102b described with respect to customer-access unit 16. Thus modem 102, included in regenerator/customer-access-unit 20 represents any appropriate hardware and/or controlling logic for modulating and/or demodulating communications signals.

In operation, regenerator/customer-access-unit 20 may operate to regenerate communications signals on a medium-voltage power line 18 and/or provide one or more customers with access to communications network 10. In certain embodiments, regenerator/customer-access-unit 20 may function as either a regenerator unit 14 or a customer-access unit 16. In a particular embodiment, regenerator/customer-access unit 20 may function as both a regenerator unit 14 and a customer-access unit 16. For example, regenerator/customer-access unit 20 may receive communications signals from medium-voltage power line 18, selectively communicate a portion of the received communications signals to a low-voltage power line, and selectively communicate a portion of the received communications signals to medium-voltage power line 18. In certain embodiments, regenerator/customer-access unit 20 may also receive wireless signals through the use of a wireless access point 106. For example, wireless signals received by a wireless access point 106 may include instructions for monitoring and/or modifying the operation of regenerator/customer-access unit 20. As another example, wireless signals received by wireless access point 106 may be transmitted to a medium-voltage power line 18 by a modem 102a or may be transmitted to a low-voltage power line by modem 102b. In certain embodiments, wireless access point 106 may operate to create a wireless "hot spot," by providing wireless Internet access to one or more wireless devices.

FIGS. 5A and 5B illustrate example power-line communications systems, including underground medium-voltage power lines 18, padmount transformer 22, and low-voltage power line 26. As shown in FIG. 5A, in certain embodiments, power-line communications system 10 may include regenerator 14 and customer-access unit 16, both located in proximity to padmount transformers. As shown in FIG. 5B, in certain embodiments, power-line communications system 10 may include combination regenerator/customer-access units 20.

In operation, communications signals are carried through power-line communications system 10 to and/or from one or more customers 24. For example, these communications signals may be transmitted along underground medium-voltage power lines 18 and, if needed to prevent attenuation, regenerated by regenerator unit 14 or regenerator/customer-access unit 20. Once these communications signals reach padmount transformer 22, typically in close proximity to customer 24, at least a portion of the communications signals may be transmitted to customer 24 through the use of low-voltage power line 26. In certain embodiments, these communications signals may be transmitted by customer-access unit 16 and/or regenerator/customer-access unit 20.

FIGS. 5A and 5B are intended to illustrate the operation of exemplary power-line communication systems 10. Although FIGS. 5A and 5B each depict power-line communication systems 10 including two padmount transformers 22, this is not intended to limit the scope of the present invention. It is expected that power-line communications systems 10 according to the present invention may include more (or fewer) padmount transformers 22. In addition, although in both FIGS. 5A and 5B, the padmount transformer 22 connected to low-voltage power line 26 represents the end of the line (i.e., does not connect to a down-stream medium-voltage power line 18), in alternative embodiments padmount transformer 22 may connect to low-voltage power line 26 as well as both upstream and downstream medium-voltage power lines 18.

Figure 6:
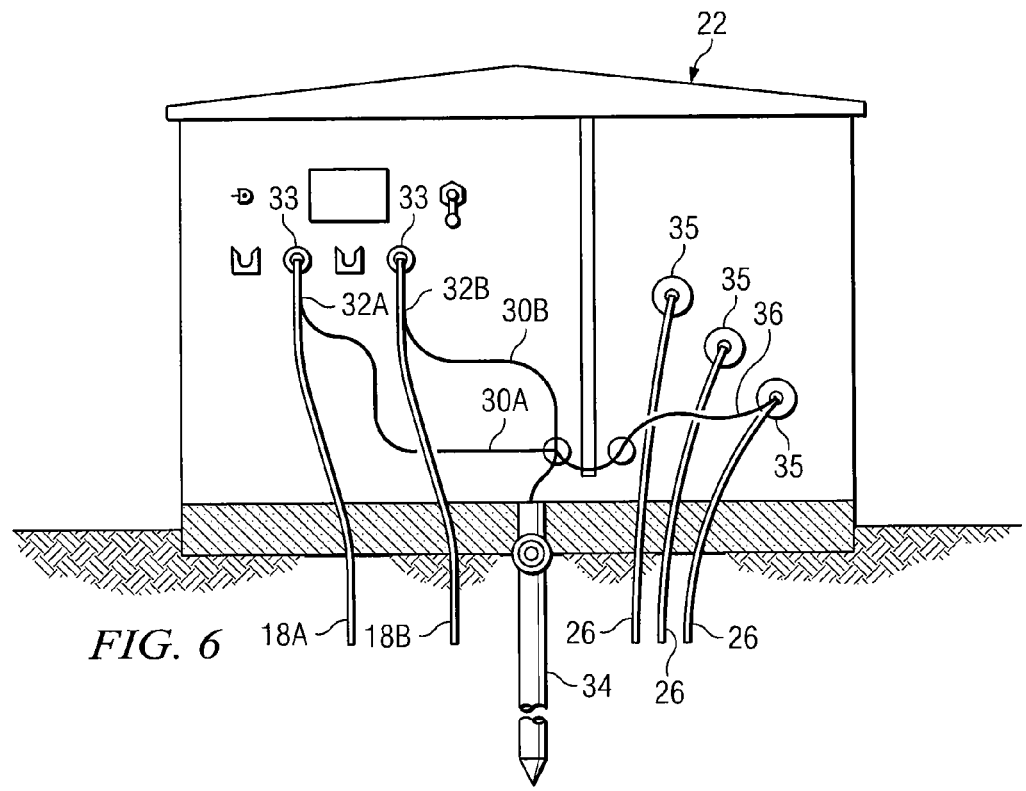
FIG. 6 illustrates an example padmount transformer coupled to underground medium-voltage power lines.

FIG. 6 illustrates an example padmount transformer 22 coupled to underground medium-voltage power lines 18. In certain embodiments, padmount transformer 22 is set on a concrete pedestal (pad) and mounted at (or slightly above) ground level. In certain embodiments, padmount transformer 22 may be positioned within a few hundred feet of one or more customers 24 served by power-line communications system 10. In the embodiment shown, padmount transformer 22 is coupled to two underground medium-voltage power lines 18A and 18B, three low-voltage power lines 26, and a ground rod 34. In operation, padmount transformer 22 steps down the voltage from underground medium-voltage power lines 18 to low-voltage power lines 26 for delivery to customer 24.

In certain embodiments, underground medium-voltage power lines 18A and 18B may include a medium-voltage center phase conductors 32A and 32B, respectively, an insulative material surrounding the medium-voltage center phase conductor 32, and a concentric neutral conductor surrounding the insulative material. In a particular embodiment, medium-voltage center phase conductor 32 may represent an aluminum wire or group of aluminum wires and the concentric neutral conductor may represent many strands of copper wire surrounding the insulative material. In certain embodiments, underground medium-voltage power line 18 may also include a waterproof sheath that may cover the concentric neutral conductor.

In the embodiment shown, each medium-voltage center phase conductor 32 is coupled to padmount transformer 22 through the use of bushings 33. In certain embodiments, bushings 33 may couple to the medium-voltage primary circuit of padmount transformer 22 and the primary windings of the transformer in the housing. In the embodiment shown, ground conductors 30A and 30B couples the concentric neutral conductor of lines 18A and 18B, respectively, to the housing of padmount transformer 22 and ground rod 34. In certain embodiments, ground conductor 30 may be formed by peeling a portion of the concentric neutral conductor away from a portion of medium-voltage power line 18, twisting the strands of the neutral conductor together, and then coupling the twisted strands to the housing and ground rod 34. In an alternative embodiment, a separate wire or cable may be used to form ground conductor 30.

In the embodiment shown, low-voltage power lines 26 are coupled to padmount transformer 22 through the use of bushings 35. In certain embodiments, bushings 35 may provide two phase 240/120V service connections along with a grounded neutral connection. For example, in certain embodiments, one or more low-voltage power lines 26 may be coupled to ground rod 34, such as through the use of one or more conductors 36. In certain embodiments, padmount transformer 22 may be coupled to more or fewer underground medium-voltage power lines 18. Similarly, in certain embodiments, padmount transformer 22 may be coupled to more or fewer low voltage power lines 26.

Figure 7:
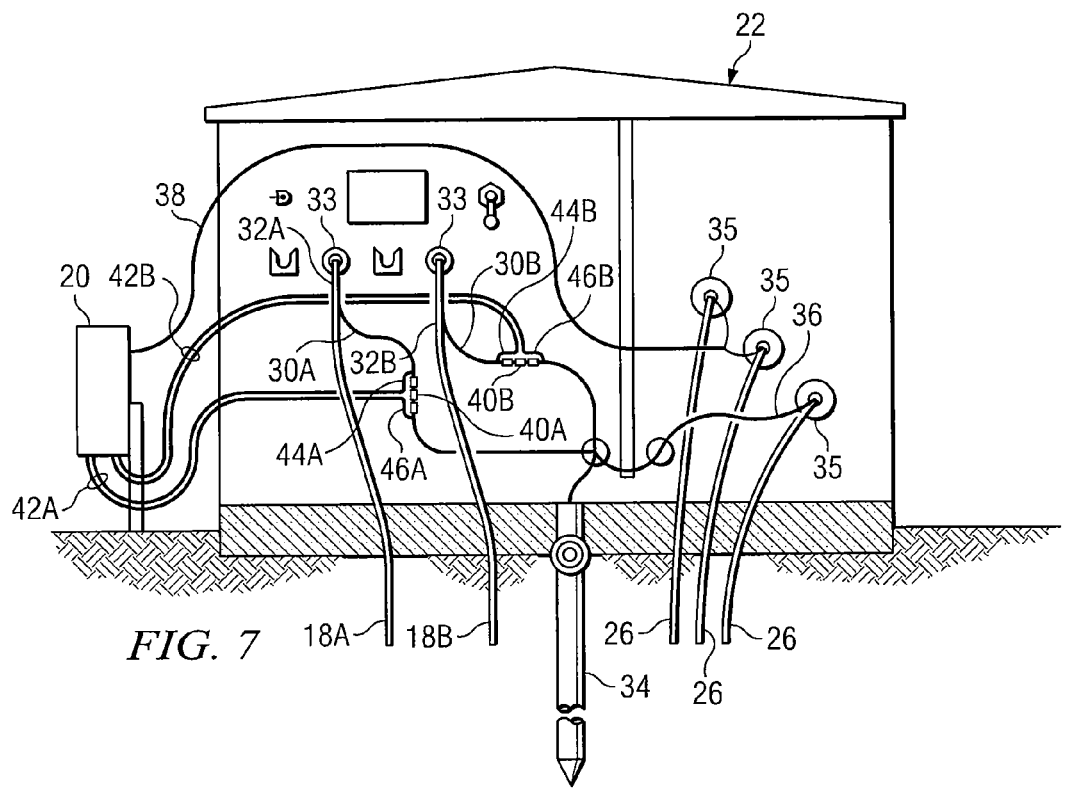
FIG. 7 illustrates an example technique for coupling communications signals onto an underground medium-voltage power line, according to a particular embodiment.

FIG. 7 illustrates an example technique for coupling communications signals onto underground medium-voltage power lines 18 included in power-line communications system 10. In the embodiment shown, power-line communications system 10 includes underground medium-voltage power lines 18A and 18B, regenerator/customer-access unit 20, padmount transformer 22, low-voltage power lines 26, ground rod 34, and low-voltage communications lines 42. In certain embodiments, power-line communications system 10 may include regenerator unit 14 or customer-access unit 16 in lieu of regenerator/customer-access unit 20. In the embodiment shown, regenerator/customer access unit 20 is connected to two medium-voltage power lines 18, with associated elements distinguished by designations "A" and "B". However, in the description below, although applicable to both connections, only one connection will be described.

In certain embodiments, electrical currents passing through ground conductor 30 from medium-voltage power lines 18A and 18B to ground rod 34 may pass through low-pass filters 40A and 40B respectively, such that ground conductors 30A and 30B may include a first portion and a second portion, with the first portion extending between medium-voltage power line 18 and low-pass filter 40 and the second portion extending between low-pass filter 40 and ground rod 34. Low-pass filters 40 provide impedance for high-frequency communications signals, accordingly low-pass filters 40 may be any appropriate device which provides impedance to high-frequency communications signals. In the embodiment shown, one or more ferrites serve as low-pass filter 40 by coupling to (or substantially surrounding) ground conductor 30 between the first portion and the second portion. In this embodiment, the ferrites may be any appropriate ferrite impedance device, such as, for example, a Fair-rite 0443164151. In alternative embodiments, one or more separate components may serve as low-pass filter 40. For example, ground conductor 30 may be severed and the first portion and second portions of ground conductor 30 coupled to the one or more separate components serving as low-pass filter 40.

Low-voltage communications lines 42A and 42B may represent any appropriate single- or multi-conductor cable or wire. For example, low-voltage communications line 42 may represent a coaxial cable with an impedance in the range from approximately 50 to 75 ohms. In certain embodiments, each low-voltage communication line 42 may represent a single, two-conductor cable including conductors 44 and 46.

In certain embodiments, conductors 44A and 44B may be coupled to the first portion of ground conductor 30 on one side of low-pass filters 40A and 40B, respectively, and conductors 46A and 46B may be coupled to the second portion of ground conductor 30 on the other side of low-pass filters 40A and 40B, respectively. The inherent capacitance between the concentric neutral conductor and medium-voltage center phase conductor 32, together with the use of low-pass filter 40 may operate to couple communications signals to and/or from medium-voltage power line 18. The placement of low-pass filter 40 operates to isolate upstream and downstream portions of underground medium-voltage power line 18 and provides additional isolation between multiple low-voltage communications lines 42.

In the embodiment shown, regenerator/customer-access unit 20 is coupled to low-voltage power lines 26 through the use of conductor 38. In certain embodiments, conductor 38 may operate to provide a low-voltage power supply for regenerator/customer-access unit 20.

In operation, communications signals are carried by medium-voltage power line 18. Medium-voltage power line 18 is coupled to low voltage communications line 42 through a connection to ground conductor 30. In the embodiment shown, this connection is made by conductor 44. Low-voltage communications line 42 is coupled to a communications device, such as regenerator/customer access unit 20. Through these connections, the communications signals are carried from medium-voltage power line 18 to the communications device. In certain embodiments, all or a portion of the communications signal may be regenerated and carried to another medium-voltage power line 18 through similar connections. In certain embodiments, the communications device may be connected to a low-voltage communications line 42 which is further connected to a low-voltage power line 26. In the embodiment shown, this connection is made through the use of conductor 46. To reduce interference, conductor 44 is separated from conductor 46 by low-pass filter 40, which impedes the transmission of high frequency communications signals. In the embodiment shown, ferrites serve as low-pass filter 40. In operation, embodiments including connections between the communications device and the low-voltage power line may allow for all or a portion of the communications signals to be carried from the communications device to one or more customers.

Although the embodiments illustrated utilize padmount transformer 22, the techniques illustrated may also be used in association with other devices which are fed by underground medium-voltage power lines 18. In certain embodiments, these techniques may be applied to any device which exposes the concentric neutral connections of underground medium-voltage power lines 18.

Figure 8:
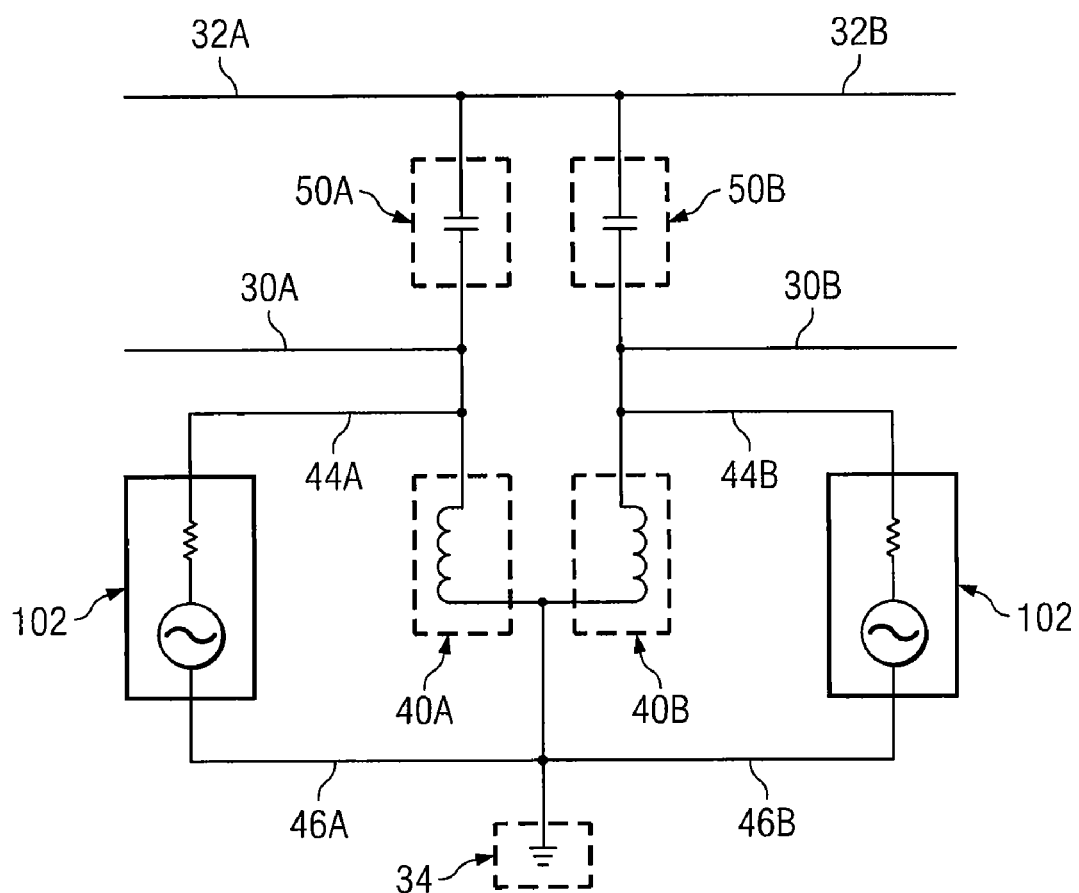
FIG. 8 is a circuit diagram illustrating an example connector of a regenerator/customer-access unit to an underground medium-voltage power line, according to a particular embodiment.

FIG. 8 is a circuit diagram illustrating an example connection of the two modems 102 (for example, as described in FIGS. 2 through 4 a regenerator/customer-access unit 20 to an underground medium-voltage power lines 18A and 18B, according to a particular embodiment.

Modems 102 induce communications signals onto ground conductors 30A and 30B with ground rod 34 as the reference. The use of low-pass filters 40A and 40B assists in isolating the first portion of ground conductors 30A and 30B from the second portion of ground conductors 30A and 30B at the frequencies utilized by the communications signals, typically in the range of 2-50 Mhz. The isolation provided by low-pass filters 40A and 40B improves the efficiency of the transfer of communications signals between low-voltage communications lines 42A and 42B and medium-voltage power lines 18A and 18B.

The intrinsic capacitance 50A and 50B of the concentric neutral conductor to medium-voltage center phase conductors 32A and 32 B couples the communications signals to medium-voltage center phase conductor 32 over a certain distance. Although the coupling efficiency may be lower due to the use of ground rod 34, when medium-voltage power lines 18 span large distances (up to thousands of feet), the efficiency of this coupling may improve. Thus, overhead to underground transitions of the medium-voltage power lines 18 that result in the termination described above will extract sufficient communications signals to terminate regenerator/customer-access unit 20.

Although the present invention has been described with several embodiments, a plenitude of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for coupling communications signals to an underground medium-voltage power line, the system comprising:
   a medium-voltage power line comprising a center phase conductor and a concentric neutral conductor, wherein the center phase conductor is coupled to a transformer and a portion of the concentric neutral conductor is separated from the medium-voltage power line to form a ground wire, the ground wire coupled to the concentric neutral conductor of the medium-voltage power line without the use of a lightning arrestor, the ground wire coupled to a ground rod;
   one or more ferrites substantially surrounding at least a portion of the ground wire between the medium-voltage power line and the ground rod;
   a coaxial cable comprising a first conductor and a second conductor, wherein the first conductor is coupled to the ground wire between the one or more ferrites and the medium-voltage power line and wherein the second conductor is coupled to the ground wire between the one or more ferrites and the ground rod; and
   a communications device coupled to the coaxial cable, the communications device comprising at least one modem.

2. A system for coupling communications signals to an underground medium-voltage power line, the system comprising:
   a medium-voltage power line comprising a center phase conductor and a concentric neutral conductor;
   a ground conductor coupling the concentric neutral conductor to a ground connection; the ground conductor coupled to the concentric neutral conductor of the medium-voltage power line without the use of a lightning arrestor;
   one or more ferrites substantially surrounding at least a portion of the ground conductor; and
   a low-voltage communications line comprising a first conductor and a second conductor, wherein the first conductor is coupled to the ground conductor between the one or more ferrites and the concentric neutral conductor and wherein the second conductor is coupled to the ground conductor between the one or more ferrites and the ground connection.

3. The system of claim 2, wherein the ground conductor comprises a portion of the concentric neutral conductor separated from the medium-voltage power line.

4. The system of claim 2, wherein the ground connection comprises a ground rod, wherein at least a portion of the ground rod is buried under ground.

5. The system of claim 2, wherein the low-voltage communications line comprises a coaxial cable.

6. The system of claim 2, further comprising a communications device coupled to the low-voltage communications line, the communications device comprising at least one modem.

7. A method for coupling communications signals to an underground medium-voltage power line, the method comprising:
   coupling a first conductor of a low-voltage communications line to a ground conductor at a first position, the ground conductor coupling a concentric neutral conductor of a medium-voltage power line to a ground connection without the use of a lightning arrestor; and
   coupling a second conductor of the low-voltage communications line to the ground conductor at a second position;
   wherein one or more ferrites substantially surround at least a portion of the ground conductor between the first position and the second position.

8. The method of claim 7, wherein the low-voltage communications line comprises a coaxial cable.

9. The method of claim 7, wherein the ground conductor comprises a portion of the concentric neutral conductor separated from the medium-voltage power line.

10. The method of claim 7, wherein the ground connection comprises a ground rod, wherein at least a portion of the ground rod is buried under ground.

11. The method of claim 7, the method further comprising coupling the first and second conductor to a communications device comprising at least one modem.

12. A system for coupling communications signals to an underground medium-voltage power line, the system comprising:
   a medium-voltage power line;
   a low-pass filter;
   a ground conductor coupling the medium-voltage power line to a ground connection, without the use of a lightning arrestor, the ground conductor having a first portion and a second portion separated by the low-pass filter; and
   a communications line comprising a first low-voltage conductor and a second low-voltage conductor, wherein the first low-voltage conductor is coupled to the first portion of the ground conductor and wherein the second low-voltage conductor is coupled to the second portion of the ground conductor.

13. The system of claim 12, wherein the medium-voltage power Line comprises a center phase conductor and a concentric neutral conductor.

14. The system of claim 13, wherein the first portion of the ground conductor couples to the concentric neutral conductor.

15. The system of claim 13, wherein the ground conductor comprises a portion of the concentric neutral conductor separated from the medium-voltage power line.

16. The system of claim 12, wherein the low-pass filter provides impedance to radio frequency signals.

17. The system of claim 12, wherein:
   the first portion of the ground conductor and the second portion of the ground conductor are portions of the same conductive wire or cable; and
   the low-pass filter comprises one or more ferrites.

18. The system of claim 12, wherein the communications line comprises a coaxial cable.

19. The system of claim 12, further comprising a communications device coupled to the communications line, the communications device comprising at least one modem.

20. A system for coupling communications signals to an underground medium-voltage power line, the system comprising:
   first conducting means for conducting a medium-voltage current;
   impedance means for impeding a high frequency signal;

coupling means for coupling the first conducting means to a ground connection without the use of a lightning arrestor, the coupling means having a first portion and a second portion separated by the impedance means;

communications means for communicating low-voltage communications signals, the communications means comprising a second conducting means and a third conducting means, wherein the second conducting means couples to the first portion of the coupling means and wherein the third conducting means couples to the second portion of the coupling means.

* * * * *